United States Patent
LeMarbe et al.

(10) Patent No.: US 10,962,318 B2
(45) Date of Patent: Mar. 30, 2021

(54) AMMUNITION MAGAZINE RETENTION DEVICE

(71) Applicant: Point Blank Enterprises, Inc., Pompano Beach, FL (US)

(72) Inventors: Randall Jered LeMarbe, Coral Springs, FL (US); Leomar Roque, Davie, FL (US)

(73) Assignee: Point Blank Enterprises, Inc., Pompano Beach, FL (US)

( * ) Notice: Subject to any disclaimer, the term of this patent is extended or adjusted under 35 U.S.C. 154(b) by 0 days.

(21) Appl. No.: 16/251,955

(22) Filed: Jan. 18, 2019

(65) Prior Publication Data
US 2020/0232738 A1    Jul. 23, 2020

(51) Int. Cl.
| | |
|---|---|
| *F42B 39/02* | (2006.01) |
| *F41A 17/38* | (2006.01) |
| *A45F 5/02* | (2006.01) |
| *F41C 33/02* | (2006.01) |
| *F16M 13/04* | (2006.01) |

(52) U.S. Cl.
CPC .............. *F41A 17/38* (2013.01); *A45F 5/022* (2013.01); *A45F 2200/0591* (2013.01); *F16M 13/04* (2013.01); *F41C 33/02* (2013.01); *F42B 39/02* (2013.01)

(58) Field of Classification Search
CPC .. F42B 39/02; A45F 5/02; A45F 5/021; A45F 2200/0591; A45F 5/08; A45F 2200/08
See application file for complete search history.

(56) References Cited

U.S. PATENT DOCUMENTS

| | | | |
|---|---|---|---|
| 3,938,717 A * | 2/1976 | Theodore | F41A 9/63 224/183 |
| 5,152,442 A | 10/1992 | Gallagher | |
| 5,174,482 A * | 12/1992 | Rogers | F42B 39/02 221/185 |
| 5,303,860 A * | 4/1994 | Serafini, Jr. | F41C 33/0218 220/324 |
| 5,484,093 A | 1/1996 | Hellweg et al. | |
| 5,533,657 A * | 7/1996 | Rosen | A45F 5/02 224/191 |
| 5,617,582 A * | 4/1997 | Burwell | A41D 13/0012 2/102 |
| 5,676,241 A | 10/1997 | Degoix et al. | |

(Continued)

FOREIGN PATENT DOCUMENTS

| | | |
|---|---|---|
| EP | 2442064 A3 | 9/2014 |
| WO | WO-2016195960 A1 | 12/2016 |

*Primary Examiner* — Brian D Nash
(74) *Attorney, Agent, or Firm* — Honigman LLP

(57) ABSTRACT

A magazine retention device includes an attachment pouch and an insert. The attachment pouch includes a front panel, a rear panel opposing the front panel, and an attachment portion. The front panel is secured to the rear panel forming a cavity between the front panel and the rear panel. The attachment portion is configured to attach to a carrier. The insert is disposed within the cavity and secured to the attachment pouch. The insert has an first region and a second region. The first region includes a rectangular opening configured to receive a magazine. The second region includes one or more walls that bias toward a center of the cavity. Here, the one or more walls bias in contact with a received magazine.

20 Claims, 8 Drawing Sheets

(56) References Cited

U.S. PATENT DOCUMENTS

| | | | |
|---|---|---|---|
| 6,000,589 A | 12/1999 | Burdine | |
| 6,154,997 A * | 12/2000 | Aluotto | F41C 33/02 224/239 |
| 6,202,908 B1 * | 3/2001 | Groover | F42B 39/02 224/236 |
| 6,634,131 B1 | 10/2003 | Fitzpatrick | |
| 6,675,693 B1 * | 1/2004 | Heayn | F41A 9/79 89/34 |
| 6,796,074 B1 | 9/2004 | Obong | |
| 6,799,500 B1 * | 10/2004 | Kulikowski | F41A 9/79 89/1.1 |
| 7,025,238 B2 * | 4/2006 | Hughes | A45F 5/00 206/3 |
| 7,458,491 B2 * | 12/2008 | Cragg | F42B 39/02 224/648 |
| 7,780,048 B2 * | 8/2010 | Howell | A41D 13/0012 224/242 |
| 7,918,371 B2 | 4/2011 | Wilson | |
| 8,011,544 B1 * | 9/2011 | Howell | A45F 5/02 224/196 |
| 8,231,038 B2 | 7/2012 | Felts | |
| 8,240,532 B2 | 8/2012 | Cragg | |
| 8,485,405 B2 | 7/2013 | Crye | |
| 8,887,972 B2 * | 11/2014 | Solomon | A45F 5/02 224/245 |
| 8,887,977 B2 * | 11/2014 | Ralph | F42B 39/02 224/245 |
| 9,097,489 B2 * | 8/2015 | Chiang | F41C 27/00 |
| D749,843 S * | 2/2016 | Faifer | D3/262 |
| 9,394,080 B2 * | 7/2016 | Beck | F42B 39/26 |
| 9,448,050 B1 * | 9/2016 | Barwin | F42B 39/08 |
| 9,549,606 B1 * | 1/2017 | Casadesus | A45F 5/021 |
| 9,668,568 B2 * | 6/2017 | Evans | A45F 5/00 |
| 9,759,536 B2 * | 9/2017 | Gadams | B65D 25/20 |
| 10,159,330 B2 * | 12/2018 | Kovac | A45F 5/021 |
| 10,537,167 B2 * | 1/2020 | Bryant | F42B 39/02 |
| 2004/0226972 A1 * | 11/2004 | Cook | A45F 5/021 224/195 |
| 2007/0278269 A1 * | 12/2007 | Rogers | F41A 9/65 224/239 |
| 2008/0105722 A1 * | 5/2008 | Howell | F42B 39/02 224/671 |
| 2008/0277436 A1 * | 11/2008 | Wilson | F42B 39/02 224/239 |
| 2011/0107645 A1 * | 5/2011 | Faifer | F41A 9/63 42/90 |
| 2013/0014472 A1 | 1/2013 | Williams | |
| 2013/0082080 A1 | 4/2013 | Hellweg | |
| 2014/0053385 A1 * | 2/2014 | Nielsen-Cole | A45F 5/021 29/426.1 |
| 2014/0075650 A1 * | 3/2014 | Garrison | A45F 5/021 2/300 |
| 2015/0369578 A1 * | 12/2015 | Meunier | F42B 39/02 224/663 |
| 2016/0003598 A1 * | 1/2016 | Gadams | F42B 39/02 206/3 |
| 2016/0345712 A1 | 12/2016 | Moreau et al. | |
| 2016/0367021 A1 | 12/2016 | Moreau et al. | |
| 2017/0089666 A1 * | 3/2017 | Considine | F41C 33/048 |
| 2017/0099934 A1 * | 4/2017 | Evans | A45F 5/02 |
| 2020/0003526 A1 * | 1/2020 | LeMarbe | F41H 1/02 |

* cited by examiner

```
                                                    ┌─500
                                                    ▼
┌─────────────────────────────────────────────────────────────┐
│ Receiving A Fabric Front Panel, A Fabric Rear Panel, And A  │
│ Pliable Thermoplastic Insert, The Fabric Rear Panel         │
│ Including An Attachment Portion Configured To Attach        │
│ To A Carrier                                                │
│                                                        502  │
└─────────────────────────────────────────────────────────────┘
```

```
┌─────────────────────────────────────────────────────────────┐
│ Securing The Fabric Front Panel To The Fabric Rear Panel    │
│ To Form A Pocket Between The Fabric Front Panel And The     │
│ Fabric Rear Panel                                           │
│                                                        504  │
└─────────────────────────────────────────────────────────────┘
```

```
┌─────────────────────────────────────────────────────────────┐
│ Removably Attaching The Pliable Thermoplastic Insert To     │
│ Inner Walls Of The Pocket Formed Between The Fabric Front   │
│ Panel And The Fabric Rear Panel                             │
│                                                        506  │
└─────────────────────────────────────────────────────────────┘
```

*FIG. 5*

AMMUNITION MAGAZINE RETENTION DEVICE

TECHNICAL FIELD

This disclosure relates to an ammunition magazine retention device.

BACKGROUND

Carrying equipment for military and enforcement personnel has taken many forms over the years. These forms have evolved to take advantage of developments such as lightweight materials and new designs. For example, basic cotton canvas rucksacks evolved to nylon load carrying equipment (LCE). Where possible, designs modified hardware from brass and steel to aluminum and plastic. Load carrying equipment included new forms resembling a belt and suspenders with attachments for ammunition cases, canteens, tools, first-aid, etc. Different models incorporated snap fasteners and hook and loop fasteners for quick-release functionality. Attachments snapped to snap fastening eyelets. Load carrying equipment became all-purpose lightweight individual carrying equipment (ALICE) and subsequently modular lightweight load carrying equipment (MOLLE). Carrying equipment integrated the pouch attachment ladder system (PALS) with a grid of nylon webbing sewn into tactical gear, such as backpacks and modular tactical vests. With the pouch attachment ladder system, attachments could be interwoven into the webbing grid; allowing both attachment and detachment with relative ease.

SUMMARY

One aspect of the disclosure provides a magazine retention device. The magazine retention device includes an attachment pouch and an insert. The attachment pouch includes a front panel, a rear panel opposing the front panel, and an attachment portion. The front panel is secured to the rear panel forming a cavity between the front panel and the rear panel. The attachment portion is configured to attach to a carrier. In some examples, the attachment portion may be a webbing strap compatible with a pouch attachment ladder system (PALS). In some implementations, the carrier may be a modular lightweight load carrying equipment (MOLLE) garment. The insert is disposed within the cavity and secured to the attachment pouch. The insert has an upper region and a lower region. The upper region includes a rectangular opening configured to receive a magazine. The lower region includes one or more walls that bias toward a center of the cavity. Here, the one or more walls bias in contact with a received magazine.

Implementations of the disclosure may include one or more of the following optional features. In some implementations, the rectangular opening of the insert is collapsible when the insert is empty. In some examples, the insert includes a biasing member wrapped around the lower region of the insert. In some configurations, the rear panel includes an outer wall with a securement surface. Here, the insert may be attached to the securement surface when the insert is disposed within the cavity. In some examples, the attachment pouch includes a drainage port. In these examples, the insert may include a bottom wall with a hole where the hole aligns with the drainage port of the attachment pouch.

Optionally, the insert may be formed from a folded thermoplastic material. When formed from a folded thermoplastic material, the insert may include a front insert panel and a rear insert panel. Here, the front insert panel and the rear insert panel are folded and secured to each other by one or more fasteners. Additionally or alternatively, when the insert is formed from a folded thermoplastic material, the folded thermoplastic material may be cut by a laser cutter from a unitary sheet.

Another aspect of the disclosure provides an insert for a magazine. The insert includes a front wall, a first sidewall, a second sidewall, a rear wall, and a bottom wall. The first sidewall is connected to the front wall and extends from an upper walled region to a lower walled region. Here, the upper walled region includes an opening defining a cavity to receive the magazine while the lower walled region supports an end of the received magazine. The second sidewall is connected to the front wall opposite the first sidewall and extends from the upper walled region to the lower walled region. The rear wall opposes the front wall and secures to each of the first sidewall and the second sidewall in the upper walled region. The bottom wall opposes the opening defining the cavity and perpendicularly secures to each of the first sidewall, the front wall, and the rear wall. In the upper walled region, the opening defining the cavity is rectangular shaped and formed by the front wall, the first sidewall, the second sidewall, and the rear wall.

This aspect may include one or more of the following optional features. In some implementations, each of the front wall, the first sidewall, the second sidewall, the rear wall, and the bottom wall is formed from a pliable thermoplastic material. In some configurations, at least one of the front wall or the rear wall taper from the upper walled region to the bottom wall in the lower walled region. Optionally, the rectangular shaped opening is collapsible when the insert is empty.

In some examples, the front wall, the first sidewall, and the second sidewall are formed by folding a first thermoplastic panel and the rear wall and bottom wall are formed by folding a second thermoplastic panel. In these examples, the first thermoplastic panel may be secured to the second thermoplastic panel by one or more fasteners. Moreover, in these examples, the insert may further include a biasing member wrapped around the first thermoplastic panel and the second thermoplastic panel. Here the biasing member biases the first sidewall and the second sidewall towards the cavity.

In yet another aspect of the disclosure, the disclosure provides a method for forming the magazine retention device. The method includes receiving a fabric front panel, a fabric rear panel, and a pliable thermoplastic insert. Here, the fabric rear panel includes an attachment portion configured to attach to a carrier. The insert includes a front wall, a first concave sidewall, a second concave sidewall, a rear wall, and a bottom wall. The first concave sidewall is connected to the front wall and extends from an upper walled region to a lower walled region. Here, the upper walled region includes an opening defining a cavity within the pliable thermoplastic insert configured to receive the magazine while the lower walled region supports an end of the received magazine. The second concave sidewall is connected to the front wall opposite the first concave sidewall and extends from the upper walled region to the lower walled region. The rear wall opposes the front wall and secures to each of the first concave sidewall and the second concave sidewall in the upper walled region. The bottom wall opposes the opening defining the cavity within the pliable thermoplastic insert and perpendicularly secures to each of the first concave sidewall, the front wall, and the rear wall. In the upper walled region, the opening defining the cavity within the pliable thermoplastic insert is rectangular shaped and formed by the front wall, the first concave sidewall, the second concave sidewall, and the rear wall. The method also includes securing the fabric front panel to the fabric rear panel to form a pocket between the fabric front panel and the fabric near panel. The method further includes removably attaching the pliable thermoplastic insert to inner walls of the pocket formed between the fabric front panel and the fabric rear panel.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 is a flow diagram of a method for forming a magazine retention device.

Like reference symbols in the various drawings indicate like elements.

DETAILED DESCRIPTION

Figure 1:
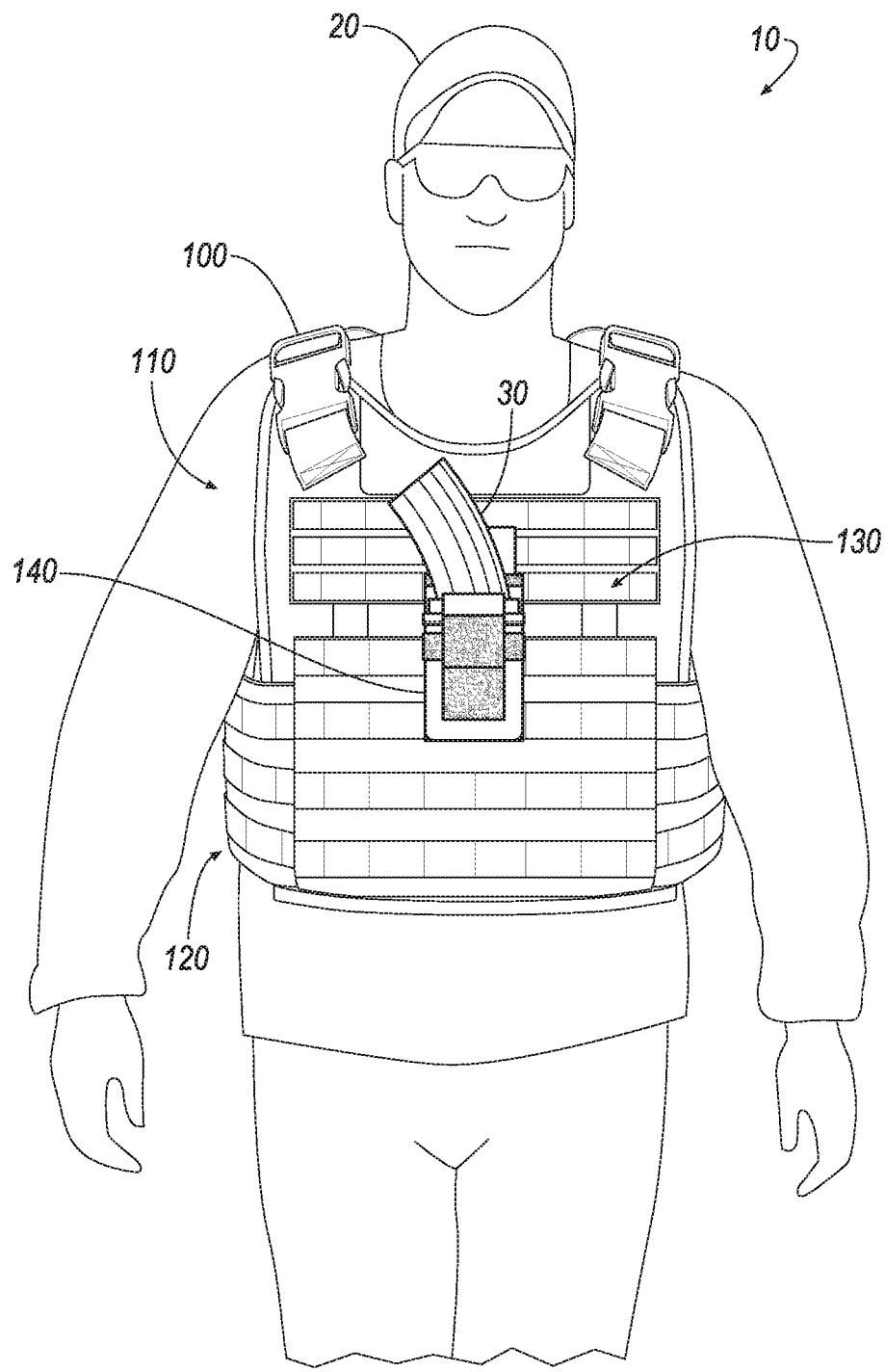
FIG. 1 is a perspective view of an example protective garment with a magazine retention device.

FIG. 1 is an example of a protective garment environment 10. In some implementations, the protective garment environment 10 includes a wearer 20 and a carrier 100. Here, the carrier 100 includes a tactical vest 110 and a cummerbund 120. Yet generally, a carrier 100 is a doffable and donable wearable that is configured for load bearing equipment (e.g., a modular lightweight load carrying equipment (MOLLE) garment). The carrier 100 may include any or all articles of clothing such as a vest, suspenders, a belt (e.g., a cummerbund), sleeves, shoulder pads, shorts, pants, a jacket, backpack, etc.

In some examples, the wearable carrier 100 is ballistic resilient. Here, a ballistic resilient carrier 100 refers to a carrier 100 designed to impede (e.g., reduce) ballistic penetration (e.g., from bullets, shrapnel, or other penetrating objects). To impede ballistic penetration, the carrier 100 may be formed from various combinations of flexible material including various woven, non-woven, synthetic, and/or natural fibers. These fibers may collectively define a layer of flexible material (e.g., a layer of fabric). In some implementations, the flexible material includes a polymeric substance (e.g., a rubber or other elastomer). In some examples, multiple layers of flexible material (e.g., fabric) are used to construct the carrier 100. Multiple layers may be used for the flexible material to increase strength, reduce fraying, or in certain circumstances contribute stiffness to the flexible material. For instance, at least one layer of a multi-layer construction of the flexible material includes a coated layer (e.g., spray coated, air knife coated, flexo-coated, gravure coated, immersion coated, etc.). Additionally or alternatively, multi-layer assemblies may be laminated together to form plies. In some implementations, a carrier 100 may be constructed from multiple plies. In other examples, a single layer is used to construct the carrier 100. In some configurations, aramid fibers, such as Nomex®, Kevlar®, Twaron®, Technora®, ultra-high-molecular-weight polyethalene (e.g., Dyneema®), Nylon, Cordura®, etc. form the carrier 100 to enable ballistic resilience.

Referring to FIG. 1, the carrier 100 has a several attachment sites 130. Each attachment site 130 is an area where the wearer 20 may fasten a tactical attachment to the carrier 100, such as ammunition cases, canteens, tools, first-aid, or other tactical equipment. For example, FIG. 1 depicts the carrier 100 with a magazine retention device 140 at the attachment site 130. The carrier 100 may be designed such that any location or area on a surface of the carrier 100 may include an attachment site 130. In some examples, the carrier 100 includes additional structures such as platforms, pouches, or pockets. These additional structures may also include attachments sites 130 as part of the carrier 100. In some implementations, the additional structures are compartments for armor inserts such as hard ballistic panels.

Depending on the configuration of the carrier 100, the attachment site 130 may include different types of means for attachment. In some examples, an attachment site 130 includes attachment slots. In other implementations, an attachment site 130 includes a grid of webbing (i.e., a pouch attachment ladder system (PALS)) to attach tactical equipment such as the magazine retention device 140. In yet other implementations, the attachment site 130 includes a mix of both attachment slots and webbing. Using either attachment slots or webbing, an attachment portion of tactical equipment may be secured to the carrier 100. For example, as shown in FIGS. 2A and 2B, the magazine retention device 140 includes an attachment portion that may be woven into (i.e. enter) a first attachment slot or first strip of webbing and woven out (i.e. exit) of a second attachment slot or second strip of webbing.

Figure 2A:
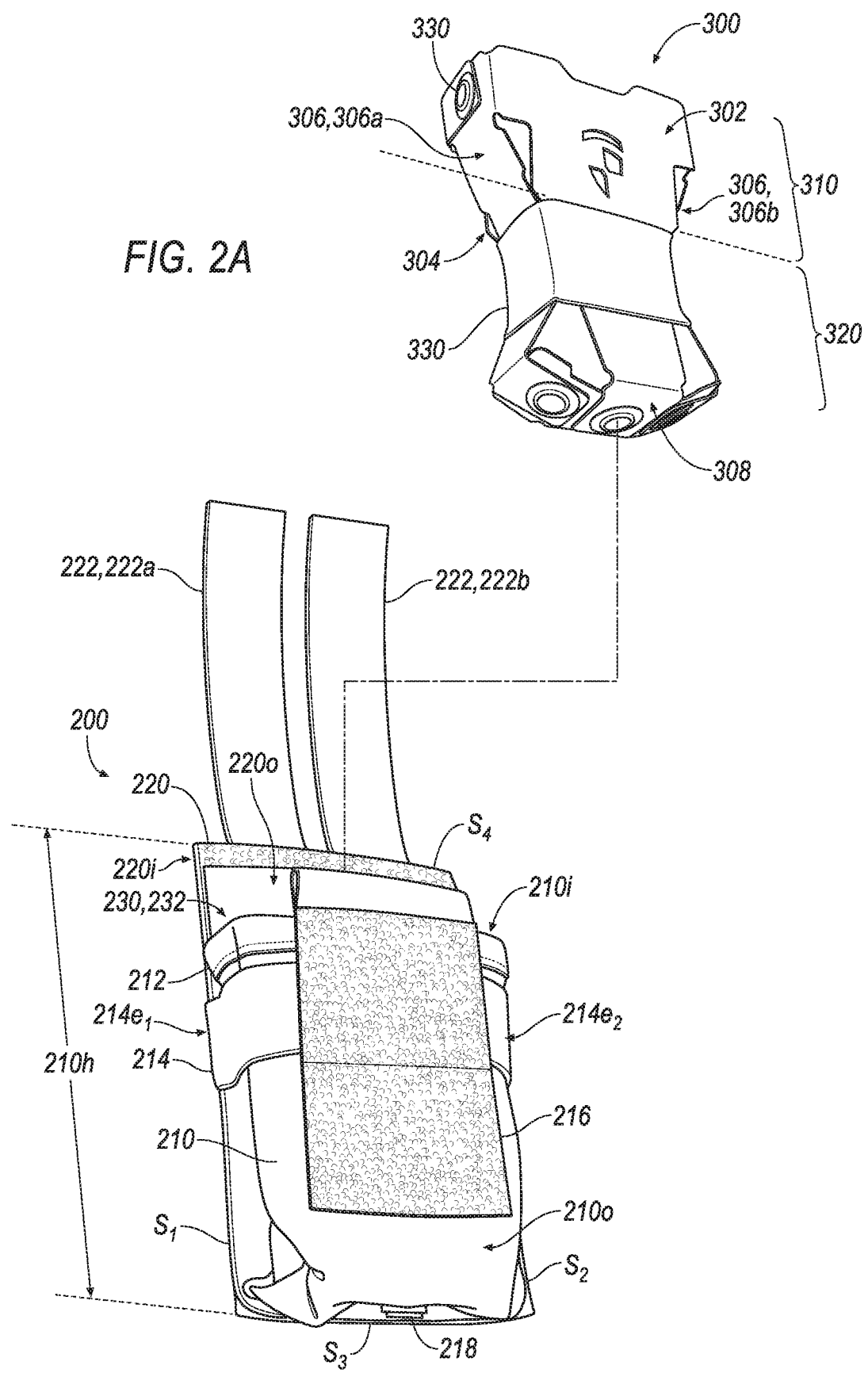
FIGS. 2A and 2B are perspective views of example magazine retention devices.
Figure 2B:
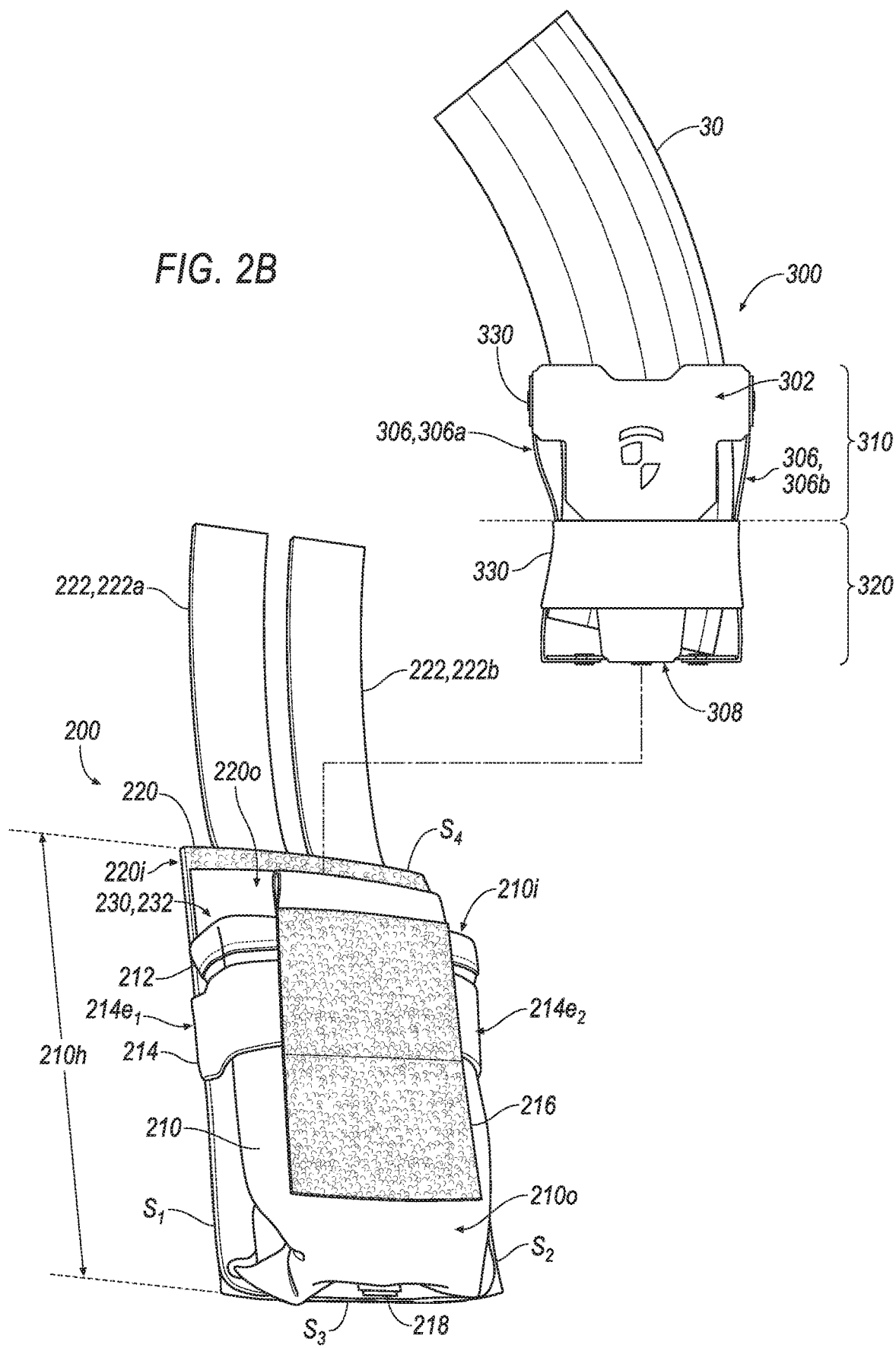

Referring to FIGS. 2A and 2B, the magazine retention device 140 generally includes an attachment pouch 200 with an insert 300 that is capable of receiving a magazine 30. The attachment pouch 200 includes a front panel 210 and a rear panel 220. In some implementations, the front panel 210 is secured to the rear panel 220 (e.g., by stitching, adhesion, welding, etc.). For example, FIGS. 2A and 2B depict the front panel 210 and the rear panel 220 as fabric panels where the front panel 210 is stitched to the rear panel 220 along a perimeter of the front panel 210 and/or rear panel 220. By securing the front panel 210 to the rear panel 220, the pouch 200 forms a cavity 230 (or pocket) that is shaped to receive the insert 300. In order to form the cavity 230, the front panel 210 is not completely secured to the rear panel 220 on all sides s such that the cavity 230 has an opening 232 to receive the magazine 30. For example, the front panel 210 is secured on three of four sides to rear panel 220.

In some implementations, the front panel 210 includes a hem 212 around a rim of the front panel 210 at the opening 232 to the cavity 230. Here, the hem 212 may allow an edge of the front panel 210 at the opening 232 to have increased strength to prevent damage or unraveling. For example, insertion and removal of a magazine 30 and/or insert 300 may expose the edge of the front panel 210 to additional stress. In some configurations, the edge of the front panel 210 at the opening 232 may be reinforced on each side. In other words, the hem 212 may exist on the inside edge (i.e., the edge that faces the cavity 230) of the front panel 210 at the opening 232 and at the outside edge of the front panel 210 at the opening 232.

In some examples, the front panel 210 includes a retaining band 214. The retaining band 214 is configured to hold the front panel 210 in a particular shape (e.g., in a U-shape against the rear panel 220). In some examples, the retaining band 214 is an elastic band or fabric material that allows the front panel 210 to expand or to contract depending on the application. The retaining band 214 may be secured at a first end $214e_1$ to a first side $s_1$ of the rear panel 220 and at a second end $214e_2$ to a second side 52 of the rear panel 220 opposite the first side $s_1$. By being secured at each end $214e_1$, $214e_2$, the retaining band 214 may collapse or expand during use. For example, in a collapsed state, the front panel 210 flattens towards the rear panel 220 (e.g., the opening 232 closes or collapses). Conversely, when the pouch 200 is not in the collapsed state, the stiffness or properties of the retaining band 214 may help retain the opening 232 of the cavity 230. For instance, when the retaining band 214 is elastic, a force on the front panel 210 may collapse the opening 232, but once the force is removed, the spring force from the elasticity of the retaining band 214 reforms the opening 232 of the cavity 230. Although a location of the retaining band 214 may differ along a height 210h of the front panel 210, FIGS. 2A and 2B depict the retaining band 214 secured in an upper region of the front panel 210 (e.g., beneath the hem 212).

In some configurations, the front panel 210 includes a securement portion 216. The securement portion 216 is configured such that other components may be fastened or secured to the front panel 210 at the securement portion 216. For example, the securement portion 216 may be a hook or a loop fastener that allows a mating with a complimentary hook or loop fastener. In some examples, the securement portion 216 is configured to not interfere with the retaining band 214. For instance, as illustrated in FIGS. 2A and 2B, the securement portion 216 is secured (e.g., stitched) to the front panel 210 to permit the retaining band 214 to expand and to contract without impingement.

The front panel 210 may also include an outer surface 210o and an inner surface 210i. Here, the inner surface 210i refers to the surface of the front panel 210 that faces the cavity 230 while the outer surface 210o faces away from the cavity 230. In some examples, these surfaces may be made from different materials. For examples, the outer surface 210o is made from a woven fabric while the inner surface 210i has a surface with increased grip or friction (e.g., surface roughness) to help retain the insert 300 in place within the cavity 230. This is helpful because a magazine 30 may be inserted or removed from the insert 300 and it is not desirable for the insert 300 to move with the magazine 30 during insertion and removal.

In some implementations, the front panel 210 includes a hole or a drain 218 (also referred to as a drainage port). With a hole or drain 218, the front panel 210 may allow water or other debris to escape from being trapped in the cavity 230. For example, the front panel 210 includes a grommet (or open grommet-like rivet) near the third side 53 of the rear panel 220. Here, the grommet has a center hole which functions as the drain 218. Although only a single drain is mentioned, the pouch 200 may have any number of drains 218 or differently sized drains 218 to facilitate the removal of debris or liquid.

In some examples, the rear panel 220 is formed from multiple layers. When the rear panel 220 is formed from multiple layers, the outer surface 220o and the inner surface 220i of the rear panel 220 may be formed from different materials. For instance, the outer surface 220o faces the front panel 210 and is formed as a securement surface. Because the inner walls of the cavity 230 are formed by the inner surface 210i of the front panel 210 and the outer surface 220o of the rear panel 220, the outer surface 220o as a securement surface secures a portion of the insert 300 to the inner walls of the cavity 230 to prevent movement of the insert 300 during insertion or removal of a magazine 30. In some examples, the securement surface is an area of hook or loop fastener in order to fasten the insert 300 directly to rear panel 220 at the securement surface. Here, the securement surface may also allow the insert 300 to be removable from the attachment pouch 200 once disposed within the cavity 230. Additionally or alternatively, the inner surface 210i of the front panel 210 may include a securement surface instead of, or in addition to, the securement surface of the outer surface 220o of the rear panel 220.

In some implementations, the rear panel 220 also includes attachment portions 222. In some examples, such as FIGS. 2A and 2B, the attachment portions 222, 222a-b are straps of webbing for securing the pouch 200 to, for example, a carrier 100. For instance, the attachment portions 222 (e.g., 222a-b) are a flat nylon webbing strap(s) compatible with PALS. In some configurations, the attachment portions 222 may additionally include hook or loop fasteners to help secure the attachment portions 222 to the carrier 100. Here, the attachment portions 222 extend from a side s (e.g., a fourth side 54 or top side) of the rear panel 220. The attachment portions 222 may be a component separate from the rear panel 220 (e.g., sewn into the rear panel 220) or integrated with the rear panel 220 (e.g., formed with the rear panel 220).

In some examples, the inner surface 220i of the rear panel 220 includes webbing straps. When webbing straps are included on the inner surface 220i of the rear panel 220, the webbing straps may be used in conjunction with the attachment portions 222 and an attachment site 130 of the carrier 100 to secure the pouch 200 to the carrier 100.

Referring further to FIGS. 2A and 2B, the magazine retention device 140 includes an insert 300. The insert 300 generally includes a front wall 302, a rear wall 304, sidewalls 306, 306a-b, and a bottom wall 308. The insert 300 is formed to fit within the cavity 230 of the pouch 200. In addition to fitting within the cavity 230, the insert 300 has a general shape to hold a magazine 30. In other words, the walls 302-308 of the insert 300 may generally conform (e.g., reinforce) to the inner walls of the cavity 230 and maintain an opening (or cavity) between the walls 302-308 with space to store a magazine 30. In order to hold the magazine 30, the insert 300 has an upper region 310 (also referred to as an upper walled region) and a lower region 320 (also referred to as a lower walled region). For example, FIG. 2A shows a line bisecting the insert 300 to designate the upper region 310 from the lower region 320. When the insert 300 is inserted into the cavity 230, the upper region 310 corresponds to a region of the insert 300 near the opening 232 of the cavity 230 (e.g., a mouth of the insert 300). The lower region 320 corresponds to a region of the insert 300 that extends to and terminates at the bottom wall 308 supporting an end of the magazine 30. In some configurations, the bottom wall 308 has a width less than the opening 232 of the cavity 230. In some examples, the upper region 310 has a generally rectangular shape (e.g., at the opening 232) allowing a box-style magazine 30 to enter the upper region 310 of the insert 300 with minimal interference. With the generally rectangular shape, someone inserting or removing the magazine 30 (e.g., the wearer 20) should not have to worry about adjusting (e.g., opening or forming) the upper region 310 of the insert 300 in order to fit the magazine 30 within the insert 300.

In some examples, in order to retain the magazine 30 firmly within the insert 300, the lower region 320 has a shape that biases towards a body of the magazine 30. For example, within the lower region 320, one or more of the sidewalls 306, 306a-b bow inward (i.e., toward a center of the magazine 30 or the center of the cavity 230) such that the sidewalls 306 are concave. By bowing inward, the sidewalls 306 increase contact with the magazine 30 allowing the insert 300 to firmly hold the magazine 30 in place within the cavity 230 of the pouch 200. In some implementations, the insert 300 includes a biasing member 330 in the lower region 320 to help hold the sidewalls 306 against the magazine 30. In these implementations, the biasing member 330 may be an elastic band. As an elastic band, the biasing member 330 may wrap around the lower region 320 drawing the sidewalls 306 against the magazine 30. For example, the insert 300 with the magazine 30 shown in FIG. 2B illustrates the sidewalls 306 flexing outward (i.e., away from the center of the cavity 230) from an original position without the magazine 30 in order to accommodate for the magazine 30. This also may ensure the sidewalls 306 stay in contact with the magazine 30 for retention purposes. For example, the wearer 20 of the carrier 100 may be in the field where the magazine retention device 140 experiences additional stresses and strain based on use of the carrier 100.

In some examples, rather than being a hard-molded insert, the insert 300 is formed of a pliable thermoplastic composite (e.g., Tegris®). As a thermoplastic composite, the insert 300 is stiff, but lightweight with impact resistance. In some implementations, as a thermoplastic, the insert 300 may be formed from various processing techniques such as laser cutting, die cutting, thermoforming, hydroforming, other forms of stamping, etc. The processing techniques and/or the properties of the thermoplastic material may also allow the insert 300 to be formed (e.g., folded) into shape.

In some implementations, portions of the insert 300 are collapsible. For instance, when the upper region 310 of the insert 300 has a rectangular opening, the rectangular opening may collapse (e.g., shift into a parallelogram shape) within the cavity 230. In other words, the insert 300 may collapse when the insert 300 is empty (i.e., without a magazine 30). To illustrate, the wearer 20 may be crawling on his or her stomach such that an empty magazine retention device 140 experiences forces from the ground and/or weight of the wearer 20. By being collapsible, the empty insert 300 may collapse and prevent extra force or discomfort on, for example, a chest of the wearer 20. Additionally or alternatively, in these implementations, the lower region 320 may also collapse. In some configurations, when the force on the insert 300 is removed, the insert 300 may have memory or stiffness such that the insert 300 reforms from the collapsed state to a non-collapsed state such that the magazine 30 may be placed within the non-collapsed insert 300.

In some implementations, the insert 300 is a single unit. A single unit refers to either one continuous piece of material or multiple pieces secured together in an irreversible manner to form the insert 300. Here, an irreversible manner means to take apart the secured insert 300 will likely damage or break the insert 300. In some examples of a single unit, the upper region 310 and the lower region 320 are part of the same continuous wall of the insert 300. For example, the front wall 302, rear wall 304, or sidewalls 306 are continuous walls extending from the upper region 310 to the lower region 320. As continuous walls, the front wall 302 and the rear wall 304 may taper in area from the upper region 310 to the lower region 320. Referring further to FIGS. 2A and 2B, the insert 300 is a single unit where the walls 302-308 are secured together by rivets.

Figure 3:
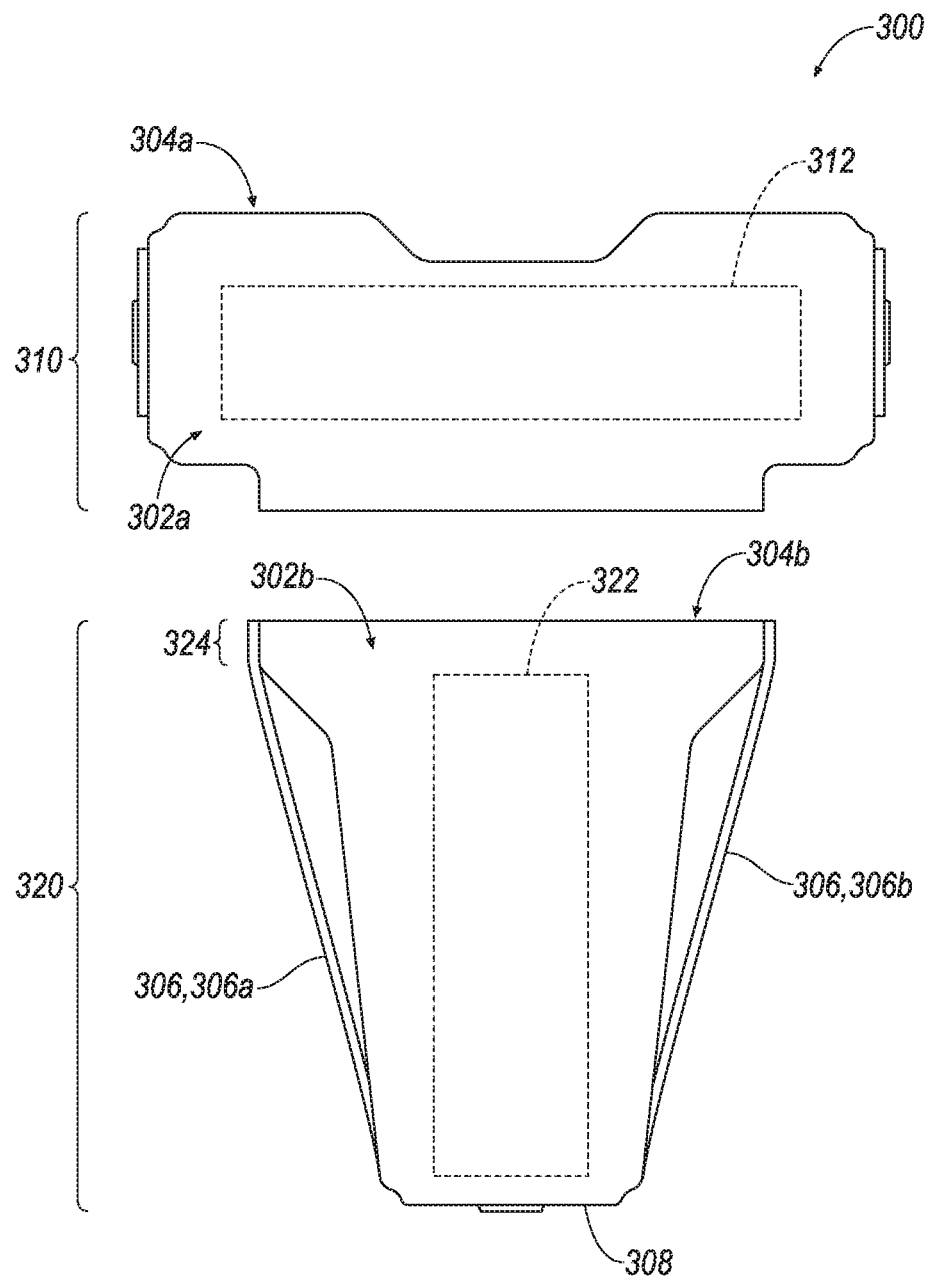
FIG. 3 is a perspective view of an example insert for the magazine retention device.

Referring to FIG. 3, in some configurations, the insert 300 is more than one piece. In some examples, when the insert 300 is more than one piece, each piece may separately secure to a wall forming the cavity 230 (e.g., the inner surface 210i of the front panel 210 and/or the outer surface 220o of the rear panel 220). For instance, FIG. 3 illustrates a securement portion 312 in the upper region 310 and a securement portion 322 in the lower region 320. These securement portions 312, 322 allow each piece of the insert 300 to attach to the inner walls of the cavity 230. For example, a securement portion 312, 322 may align with a securement surface of pouch 200. Although, FIG. 3 depicts the insert 300 of more than one piece as two pieces, the insert 300 may be constructed of any number of pieces depending on the design of the magazine retention device 140.

When the insert 300 is more than one piece, the upper region 310 and the lower region 320 may be separate pieces to form the insert 300. Here, the front wall 302 has a first portion 302a in the upper region 310 and a separate second portion 302b in the lower region 320. Similarly, the back wall 304 has a first portion 304a in the upper region 310 and a separate second portion 304b in the lower region 320.

In some configurations where the insert 300 is more than one piece, the sidewalls 306, 306a-b do not extend continuously from the upper region 310 to the lower region 320. For example, FIG. 3 depicts the sidewalls 306 only within the lower region 320 extending from the bottom wall 308 to a top portion 324 of the lower region 320. Furthermore, when the insert 300 is more than one piece, the upper region 310 lacks a bottom wall 308 in order for the insert 300 to retain the magazine 30 in each region 310, 320.

Figure 4A:
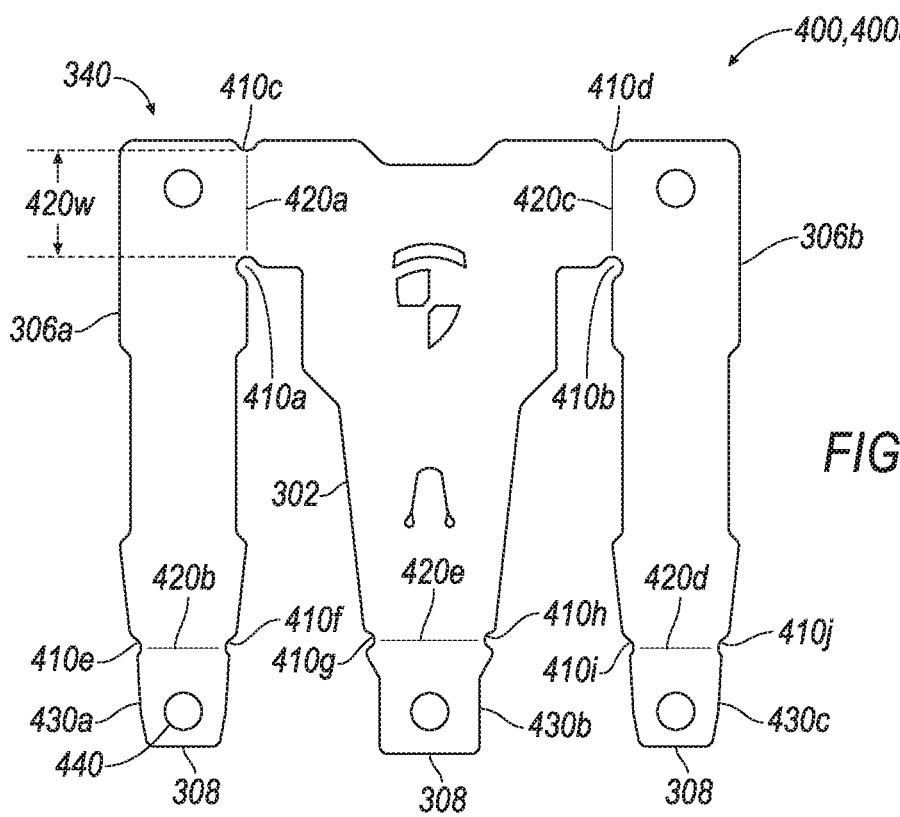
FIGS. 4A and 4B are plane views of example cut patterns for an insert of the magazine retention device.
Figure 4B:
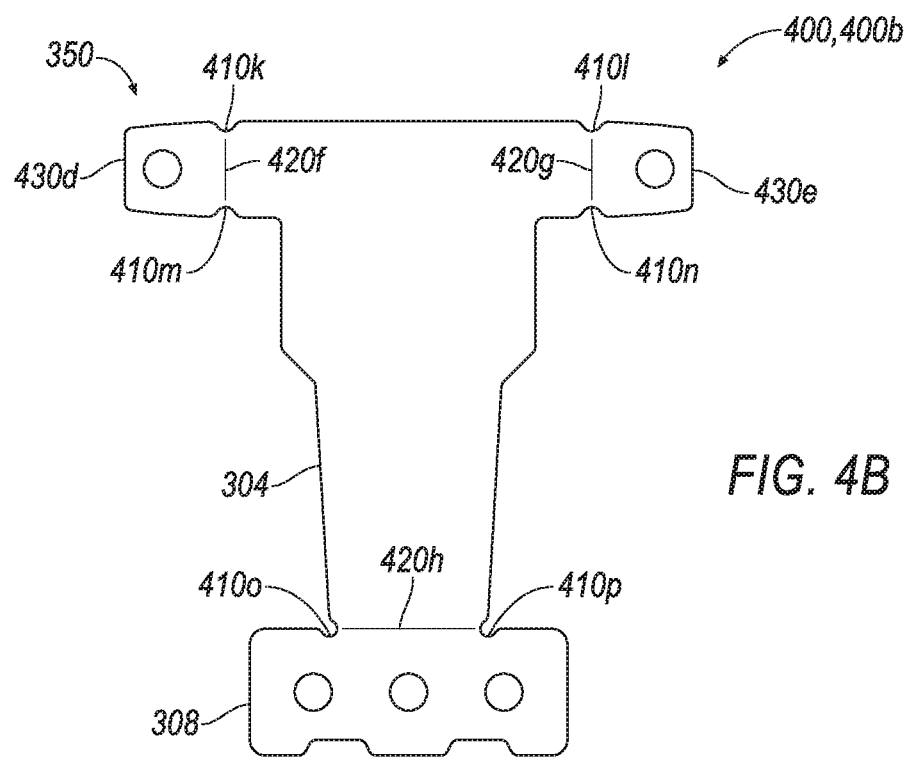
Figure 4C:
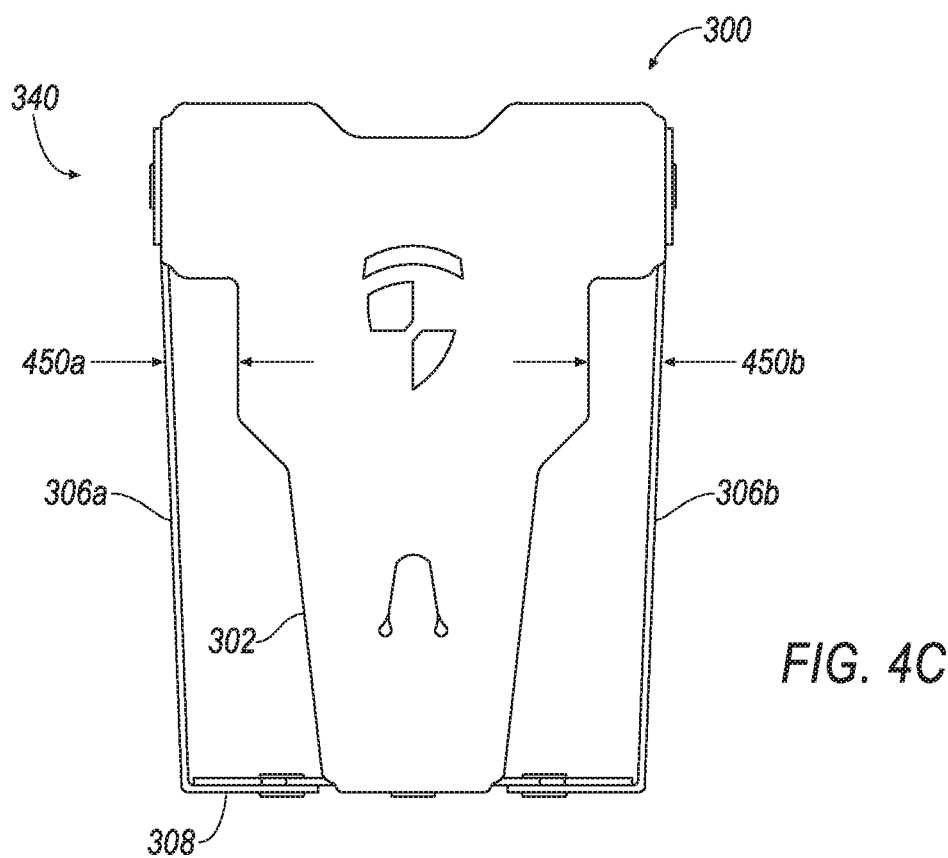
FIGS. 4C and 4D are front and rear views of examples of cut patterns assembled into an insert of the magazine retention device.
Figure 4D:
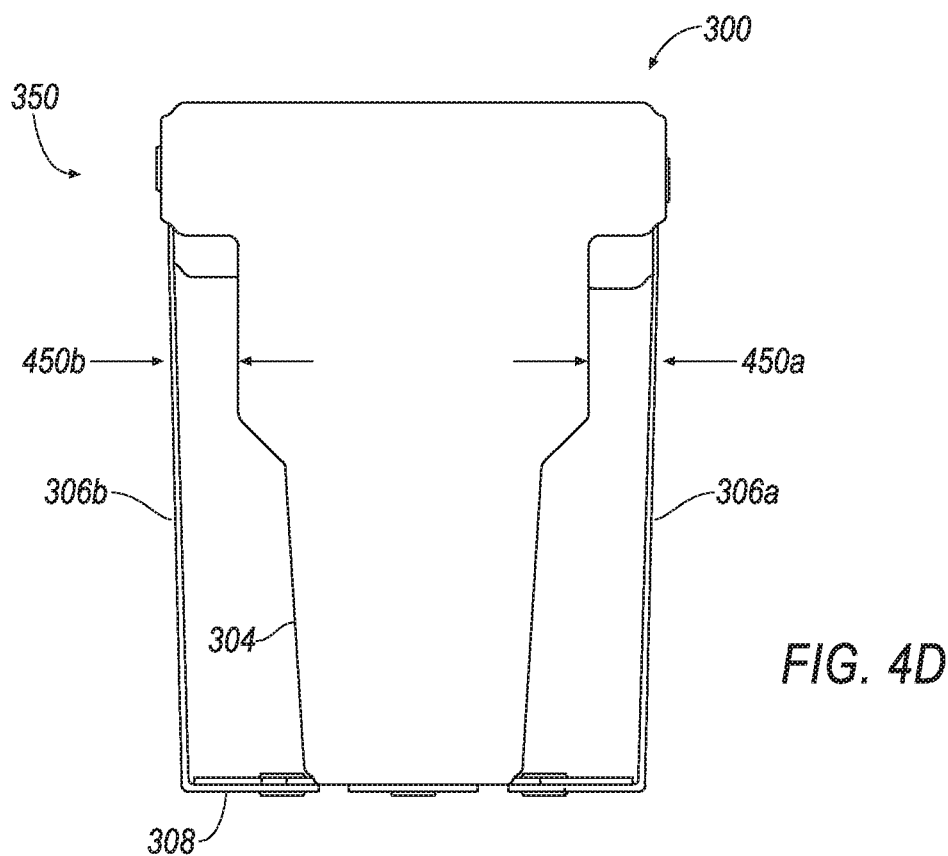

FIGS. 4A and 4B are examples of a cut pattern 400 that forms the insert 300 (shown in FIGS. 4C and 4D). The cut pattern 400 includes a first cut pattern 400a (FIG. 4A) and a second cut pattern 400b (FIG. 4B). Here, the first cut pattern 400a forms a front panel 340 of the insert 300 (FIG. 4C) and the second cut pattern 400b forms a rear panel 350 of the insert 300 (FIG. 4D).

In some examples, each cut pattern 400 includes notches 410. For example, the first cut pattern 400a includes ten notches 410, 410a-j while the second cut pattern 400b includes six notches 410, 410k-p. The notches 410 may help each cut pattern 400 to be folded along fold lines 420 to form the walls 302-308 of the insert 300. In some implementations, each notch 410 has the same or similar shape. For example, the notches 410 are shaped as chamfered radii. In other implementations, depending on the degree of fold for the fold line 420 (e.g., width of fold line 420w) the notch 410 may vary in shape. For example, the notches 410, 410a-b have a different shape than the notches 410, 410c-j (e.g., the notches 410a-b are deeper than notches 410c-j).

In some configurations, the fold lines 420 (e.g., fold lines 420a-h) are illustrative of where each cut pattern 400 may be folded. In other configurations, the fold lines 420 may be scored (e.g., by a laser or other cutter) to assist in folding the cut pattern 400 into the insert 300. In some examples, the width of the fold line 420w is proportional to a depth of a scoring of the fold line 420. In other words, a first fold line 420a may be scored deeper than a second fold line 420b because the first fold line 420a is wider than the second fold line 420b.

Referring to FIG. 4A, the first cut pattern 400a includes portions that correspond to the sidewalls 306, 306a-b, the front wall 302, and the bottom wall 308. For example, the first sidewall 306a is formed between the first fold line 420a and the second fold line 420b. The second sidewall 306b is formed between a third fold line 420c and a fourth fold line 420d. The front wall 302 is formed between the first fold line 420a, the third fold line 420c, and a fifth fold line 420e.

In some implementations, a cut pattern 400 includes at least one tab 430. A tab 430 refers to a region of the cut pattern 400 that forms a portion of a wall 302-308. For instance, the first cut pattern 400a includes three tabs 430a-c that form portions of the bottom wall 308 of the insert 300. Here, the three tabs 430a-c overlap with the bottom wall 308 formed from the second cut pattern 400b to form a portion of the bottom wall 308. Similarly, the second cut pattern 400b includes two tabs 430d-e that overlap with the sidewalls 306 of the first cut pattern 400a (e.g., to secure the front panel 340 to the rear panel 350). In some examples, a tab 430 includes a hole 440 to allow the tab 430 to be secured to other tabs 430 or portions of a cut pattern 400 by a fastener.

Generally speaking, a hole 440 formed within the cut pattern 400 may allow a fastener to secure portions of the insert 300 together. Here, the holes 440 may be overlapped during construction of the insert 300 to secure the front panel 340 from the first cut pattern 400a to the rear panel 350 of the second cut pattern 400b by a fastener (e.g., shown in FIGS. 4C and 4D). In some examples, the fastener used may be a grommet or a rivet. Additionally or alternatively, the fastener may permit debris or liquid (e.g., water) to drain out of the insert 300. In these implementations, a hole 440 for a fastener of the insert 300 may align with the drain 218 of the pouch 200.

Referring back to FIG. 4A, edges of the cut pattern 400a that form the sidewalls 306 may be spaced apart (i.e., not touching) from edges that form the front wall 302. This spacing allows a first gap 450a and the second gap 450b to exist between walls 302, 304 and the sidewalls 306 as illustrated in FIGS. 4C and 4D. Each gap 450 corresponds to areas where the sidewalls 306 are disconnected from the front wall 302 and rear wall 304. By forming these gaps 450, the cut pattern 400 may further enable the collapsibility and/or flexible nature of the insert 300.

FIG. 5 is a flow diagram of an example method 500 for forming the magazine retention device 140. At operation 502, the method 500 includes receiving a fabric front panel 210, a fabric rear panel 220, and a pliable thermoplastic insert 300. Here, the fabric rear panel 220 includes an attachment portion 222 configured to attach to a carrier 100. In this method 500 for forming the magazine retention device 140, the pliable thermoplastic insert 300 includes a front wall 302, a first concave sidewall 306a, a second concave sidewall 306b, a rear wall 304, and a bottom wall 308. The first concave sidewall 306a is connected to the front wall 302 and extends from an upper walled region 310 to a lower walled region 320 where the upper walled region 310 includes an opening 232 defining a cavity within the pliable thermoplastic insert 300 configured to receive a magazine 30 while the lower walled region 320 supports an end of the received magazine 30. The second concave sidewall 306b connects to the front wall 302 opposite the first concave sidewall 306a and extends from the upper walled region 310 to the lower walled region 320. The rear wall 304 opposing the front wall 302 is secured to each of the first concave sidewall 306a and the second concave sidewall 306b in the upper walled region 310. The bottom wall 308 is opposite the opening 232 defining the cavity within the pliable thermoplastic insert 300 and perpendicularly secures to each of the first concave sidewall 306a, the second concave sidewall 306b, the front wall 302, and the rear wall 304. Here, in the upper walled region 310, the opening 232 defining the cavity within the pliable thermoplastic insert 3000 is rectangular shaped and formed by the front wall 302, the first concave sidewall 306a, the second concave sidewall 306b, and the rear wall 304. At operation 504, the method 500 secures the fabric front panel 210 to the fabric rear panel 220 to form a pocket 230 between the fabric front panel 210 and the fabric rear panel 220. At operation 506, the method 500 removable attaches the pliable thermoplastic insert 300 to inner walls of the pocket 230 formed between the fabric front panel 210 and the fabric rear panel 220.

Figure 6A:
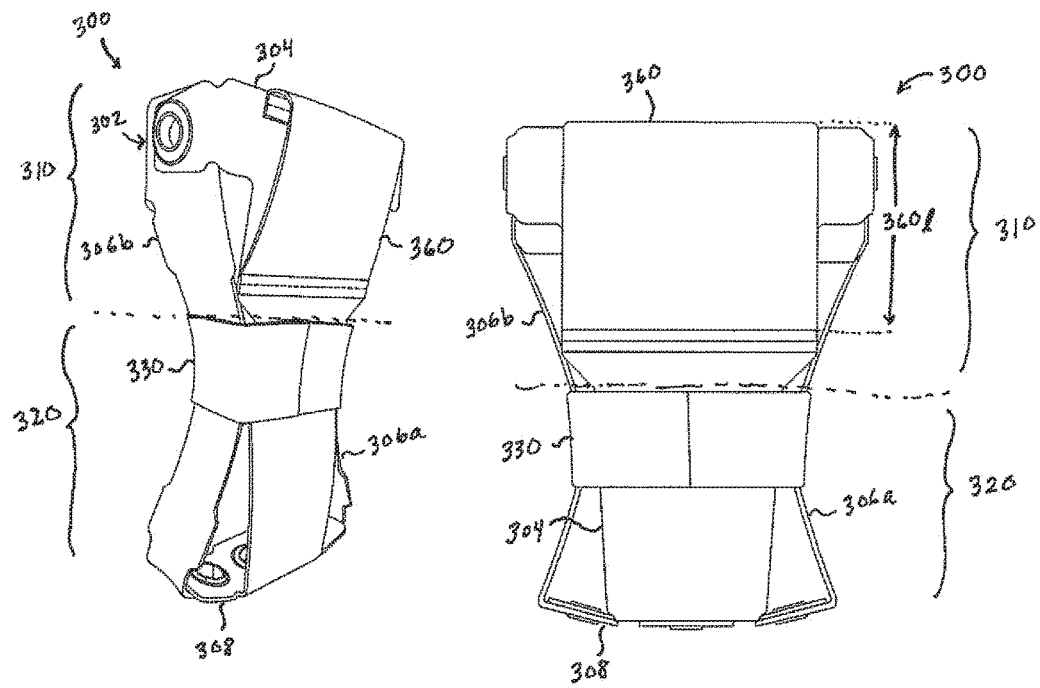
FIGS. 6A and 6B are perspective views of example inserts as the magazine retention device.
Figure 6B:
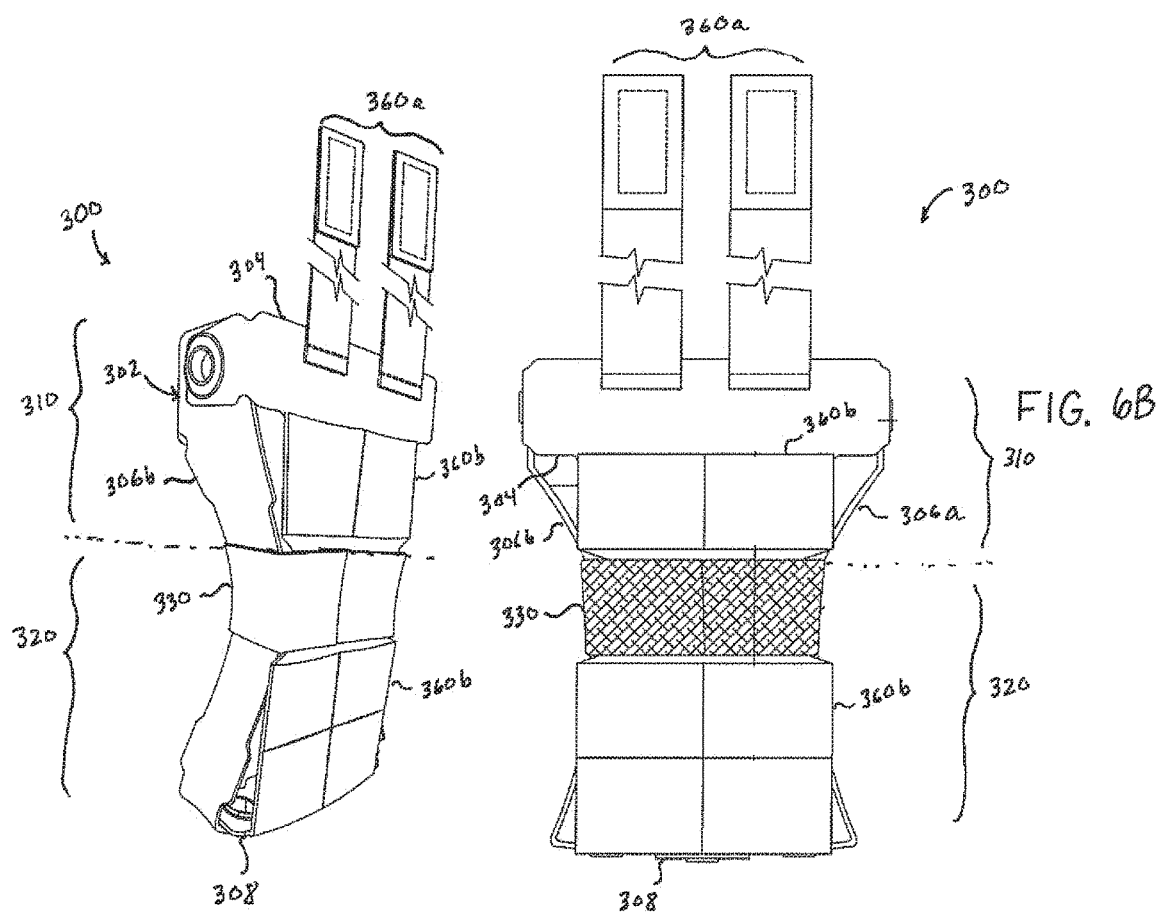

FIGS. 6A and 6B are examples of standalone inserts 300 as the magazine retention device 140. A standalone insert 300 refers to an insert 300 that is not disposed within the pouch 200. More particularly, the standalone insert 300 forms the entire magazine retention device 140 without use of the pouch 200. Here, instead of the pouch 200 including the attachment portions 222 to attach to the carrier 100, the insert 300 includes one or more attachment portions 360. Although generally these attachment portions 360 are shown on a rear wall 304 of the insert 300, the attachment portions 360 may be secured to or formed with any portion or wall of the insert 300. As one such example, the biasing member 330 includes an attachment portion 360 to secure to a carrier 100.

FIG. 6A illustrates a webbing channel as an attachment portion 360. The webbing channel is secured to the insert 300 in the upper region 310 of the rear wall 304 (e.g., by stitching, welding, gluing, etc.). As a webbing channel, the attachment portion 360 may attach to a belt (e.g., a gun belt) or other securement strap generally perpendicular to the insert 300. In order to attach to some belts or straps perpendicular to the insert 300, the webbing channel may be wider than a standard one inch MOLLE webbing strap (e.g., the webbing channel is two inches in length 360l).

FIG. 6B is an example of attachment portions 360 for the insert 300 that may attach to a PAL system on a carrier 100. Here, the insert 300 includes, as attachment portions 360, first attachment portions 360a as webbing straps that extend from the upper region 310 of the rear wall 304 of the insert 300 (e.g., similar to the attachment portions 222 depicted in FIGS. 2A and 2B for the pouch 200). In some examples, the first attachment portions 360a include sections of hook or loop fastener to aid attachment to the carrier 100 and/or a looped attachment extending to the carrier 100 and back to the insert 300. Additionally or alternatively, FIG. 6B depicts the insert 300 including second attachment portions 360b in generally the lower region 320 of the rear wall 304 of the insert 300. Here, the second attachment portions 360b are shown as standard MOLLE webbing straps (e.g., one inch webbing) extending horizontally across the rear wall 304. In some examples, these second attachment portions 360b allow the webbing straps of the first attachment portions 360a or other straps associated with a carrier 100 to secure to the insert 300 in the lower region 320. Even though the first attachment portions 360a and the second attachment portions 360b are shown together, some examples include the first attachment portions 360a or the second attachment portions 360b individually.

Although FIGS. 6A and 6B show standalone insert designs, other designs not shown may be possible as well. For instance, the rear wall 304 of the insert 300 includes slits or slots as attachment portions 360 such that webbing or straps of, for example, a PALS system may be woven through the slits or slots to attach the insert 300 to a carrier 100. Depending on the carrier 100 and/or means of attachment, these slots (or slits) may be horizontal slots or vertical slots (e.g., assuming the length of the rear wall of the insert 300 is a vertical reference). In other instances, the attachment portion 360 may be one or more hooks that slide onto the attachment site 130 (e.g., MOLLE webbing or laser cut openings). In some configurations, the insert 300 uses a hybrid of attachment portions 360 to ensure secure attachment to a carrier 100. As a hybrid, the insert 300, for example, may include any combination of hook and loop fastener attachment portion(s), hook attachment portion(s), webbing attachment portion(s), slotted attachment portion (s), etc.

A number of implementations have been described. Nevertheless, it will be understood that various modifications may be made without departing from the spirit and scope of the disclosure. Accordingly, other implementations are within the scope of the following claims.

What is claimed is:

1. A magazine retention device comprising:
   an attachment pouch including a front panel, a rear panel opposing the front panel, and an attachment portion, the front panel secured to the rear panel forming a cavity between the front panel and the rear panel, the attachment portion configured to attach to a carrier; and
   an insert disposed within the cavity and secured to the attachment pouch, the insert having a first region and a second region, the first region including a rectangular opening configured to receive a magazine, the second region including one or more walls extending inwardly from the first region toward a center of the cavity, the one or more walls configured to contact a received magazine and wherein the one or more walls extend arcuately (i) inwardly towards the center of the cavity and (ii) outwardly towards a lower end of the insert opposite the rectangular opening.

2. The magazine retention device of claim 1, wherein the second region is collapsible when the insert is empty.

3. The magazine retention device of claim 1, wherein the insert further comprises a biasing member wrapped around the second region of the insert.

4. The magazine retention device of claim 1, wherein the rear panel includes an outer wall, the outer wall including a securement surface, the insert attached to the securement surface when the insert is disposed within the cavity.

5. The magazine retention device of claim 1, wherein the insert is removable from the attachment pouch.

6. The magazine retention device of claim 1, wherein the attachment pouch further comprises a drainage port.

7. The magazine retention device of claim 6, wherein the insert includes a bottom wall with a hole, the hole aligning with the drainage port of the attachment pouch.

8. The magazine retention device of claim 1, wherein the insert is formed from a folded thermoplastic material.

9. The magazine retention device of claim 8, wherein the insert includes a front insert panel and a rear insert panel, the front insert panel and the rear insert panel folded and secured to each other by one or more fasteners.

10. The magazine retention device of claim 8, wherein the folded thermoplastic material comprises a unitary sheet having laser cut edges.

11. The magazine retention device of claim 1, wherein the attachment portion is a webbing strap compatible with a pouch attachment ladder system (PALS).

12. The magazine retention device of claim 1, wherein the carrier is a modular lightweight load carrying equipment (MOLLE) garment.

13. An insert for a magazine, the insert comprising:
   a front wall;
   a first sidewall connected to the front wall and extending from an upper walled region to a lower walled region, the upper walled region including an opening defining a cavity configured to receive the magazine, the lower walled region supporting an end of the received magazine;
   a second sidewall connected to the front wall opposite the first sidewall and extending from the upper walled region to the lower walled region;
   a rear wall opposing the front wall and secured to each of the first sidewall and the second sidewall in the upper walled region; and
   a bottom wall opposite the opening defining the cavity and perpendicularly securing to each of the first sidewall, the second sidewall, the front wall, and the rear wall,
   wherein, in the upper walled region, the opening defining the cavity is rectangular shaped and formed by the front wall, the first sidewall, the second sidewall, and the rear wall, and
   wherein the first sidewall extends arcuately (i) inwardly towards a center of the cavity and (ii) outwardly towards the lower walled region opposite the opening.

14. The insert of claim 13, wherein each of the front wall, the first sidewall, the second sidewall, the rear wall, and the bottom wall is formed from a pliable thermoplastic material.

15. The insert of claim 13, wherein the front wall, the first sidewall, and the second sidewall are formed by folding a first thermoplastic panel and wherein the rear wall and the bottom wall are formed by folding a second thermoplastic panel.

16. The insert of claim 15, wherein the first thermoplastic panel is secured to the second thermoplastic panel by one or more fasteners.

17. The insert of claim 15, further comprising a biasing member wrapped around the first thermoplastic panel and the second thermoplastic panel, the biasing member biasing the first sidewall and the second sidewall towards the cavity.

18. The insert of claim 13, wherein at least one of the front wall or the rear wall taper from the upper walled region to the bottom wall in the lower walled region.

19. The insert of claim 13, wherein the rectangular shaped opening is collapsible when the insert is empty.

20. A method comprising:
   receiving a fabric front panel, a fabric rear panel, and a pliable thermoplastic insert, the fabric rear panel including an attachment portion configured to attach to a carrier, the pliable thermoplastic insert including:
   a front wall;
   a first concave sidewall connected to the front wall and extending from an upper walled region to a lower walled region, the upper walled region including an opening defining a cavity within the pliable thermoplastic insert configured to receive a magazine, the lower walled region supporting an end of the received magazine;
   a second concave sidewall connected to the front wall opposite the first concave sidewall and extending from the upper walled region to the lower walled region;

a rear wall opposing the front wall and secured to each of the first concave sidewall and the second concave sidewall in the upper walled region; and a bottom wall opposite the opening defining the cavity within the pliable thermoplastic insert and perpendicularly securing to each of the first concave sidewall, the second concave sidewall, the front wall, and the rear wall, wherein in the upper walled region, the opening defining the cavity within the pliable thermoplastic insert is rectangular shaped and formed by the front wall, the first concave sidewall, the second concave sidewall, and the rear wall;

securing the fabric front panel to the fabric rear panel to form a pocket between the fabric front panel and the fabric rear panel; and removably attaching the pliable thermoplastic insert to inner walls of the pocket formed between the fabric front panel and the fabric rear panel.

\* \* \* \* \*